United States Patent
Lim et al.

(10) Patent No.: US 11,914,989 B2
(45) Date of Patent: *Feb. 27, 2024

(54) MULTIPROCESSOR PROGRAMMING TOOLKIT FOR DESIGN REUSE

(71) Applicant: Coherent Logix, Incorporated, Austin, TX (US)

(72) Inventors: Stephen E. Lim, Scotts Valley, CA (US); Viet N. Ngo, Austin, TX (US); Jeffrey M. Nicholson, Lakeville, MN (US); John Mark Beardslee, Menlo Park, CA (US); Teng-I Wang, Yorba Linda, CA (US); Zhong Qing Shang, Cupertino, CA (US); Michael Lyle Purnell, Scotts Valley, CA (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,336

(22) Filed: Oct. 28, 2021

(65) Prior Publication Data

US 2022/0050676 A1    Feb. 17, 2022

Related U.S. Application Data

(63) Continuation of application No. 16/818,007, filed on Mar. 13, 2020, now Pat. No. 11,163,558, which is a
(Continued)

(51) Int. Cl.
*G06F 8/71* (2018.01)
*G06F 8/41* (2018.01)
*G06F 8/60* (2018.01)

(52) U.S. Cl.
CPC ............... *G06F 8/71* (2013.01); *G06F 8/443* (2013.01); *G06F 8/60* (2013.01)

(58) Field of Classification Search
CPC ............... G06F 8/71; G06F 8/443; G06F 8/60
(Continued)

(56) References Cited

U.S. PATENT DOCUMENTS 5,274,818 A * 12/1993 Vasilevsky .......... G06F 15/8092
717/149
7,415,594 B2    8/2008 Doerr
(Continued)

FOREIGN PATENT DOCUMENTS

CN    1577294 A    2/2005
CN    1961540 A    5/2007
(Continued)

OTHER PUBLICATIONS

Nikolov et al, "Systematic and Automated Multiprocessor System Design, Programming, and Implementation", 2008, [Online], pp. 242-255, [Retrieved from internet on Oct. 19, 2023], <https://ieeexplore.ieee.org/stamp/stamp.jsp?arnumber=4378214>(Year: 2008).*
(Continued)

*Primary Examiner* — S. Sough
*Assistant Examiner* — Zengpu Wei
(74) *Attorney, Agent, or Firm* — Kowert, Hood, Munyon, Rankin & Goetzel, P.C.

(57) ABSTRACT

Techniques for specifying and implementing a software application targeted for execution on a multiprocessor array (MPA). The MPA may include a plurality of processing elements, supporting memory, and a high bandwidth interconnection network (IN), communicatively coupling the plurality of processing elements and supporting memory. In some embodiments, software code may specify one or more cell definitions that include: program instructions executable to perform a function and one or more language constructs. The software code may further instantiate first, second, and third cell instances, each of which is an instantiation of one
(Continued)

of the one or more cell definitions, where the instantiation includes configuration of the one or more language constructs such that: the first and second cell instances communicate via respective communication ports and the first and second cell instances are included in the third cell instance.

20 Claims, 12 Drawing Sheets

Related U.S. Application Data continuation of application No. 15/872,421, filed on Jan. 16, 2018, now Pat. No. 10,592,233, which is a continuation of application No. 14/047,135, filed on Oct. 7, 2013, now Pat. No. 9,904,542.

(60) Provisional application No. 61/722,850, filed on Nov. 6, 2012.

(58) Field of Classification Search
USPC .......................................................... 717/121
See application file for complete search history.

(56) References Cited

U.S. PATENT DOCUMENTS

| | | | |
|---|---|---|---|
| 8,261,270 B2 | 9/2012 | Papakipos et al. | |
| 8,473,818 B2 | 6/2013 | Mangione-Smith et al. | |
| 8,495,624 B2 | 7/2013 | Banerjee | |
| 8,918,596 B2 | 12/2014 | Dice et al. | |
| 9,009,660 B1 | 4/2015 | Griffin | |
| 2007/0226686 A1 | 9/2007 | Beardslee et al. | |
| 2007/0294663 A1 | 12/2007 | McGuire et al. | |
| 2008/0114937 A1 | 5/2008 | Reid | |
| 2008/0235490 A1 | 9/2008 | Jones | |
| 2009/0007125 A1 | 1/2009 | Barsness et al. | |
| 2009/0077011 A1 | 3/2009 | Natarajan et al. | |
| 2009/0172353 A1* | 7/2009 | Su ........................ | G06F 9/5066 712/30 |
| 2010/0107155 A1 | 4/2010 | Banerjee et al. | |
| 2010/0235847 A1 | 9/2010 | Brehmer et al. | |
| 2011/0088021 A1 | 4/2011 | Kruglick | |
| 2011/0219343 A1 | 9/2011 | Eng | |
| 2012/0137119 A1* | 5/2012 | Doerr ................... | G06F 21/575 713/100 |
| 2013/0081044 A1* | 3/2013 | Sandstrom ............. | G06F 15/80 718/104 |
| 2013/0191837 A1 | 7/2013 | Abeles et al. | |
| 2014/0007044 A1 | 1/2014 | Aliseychik | |
| 2014/0137082 A1 | 5/2014 | Ellis et al. | |

FOREIGN PATENT DOCUMENTS

| | | |
|---|---|---|
| WO | WO 2004/003781 A2 | 1/2004 |
| WO | 2011071498 | 6/2011 |

OTHER PUBLICATIONS

International Search Report and Written Opinion for Application No. PCT/US2013/063628, dated Jan. 2, 2014 (10 bages).

Wilkinson, Barry; "On Crossbar Switch and Multiple Bus Interconnection Networks with Overlapping Connectivity"; IEEE Transactions on Computers, vol. 41, No. 6, Jun. 1992; pp. 738-746; New York, New York, U.S.

Steck et al.; "Performance Enhancements of the Superscalar i960 Processor Family"; 8080 Wescon Conference Record; Nov. 1990; pp. 463-466; North Hollywood, CA, U.S.

Ozturk et al, "MultiCompilation: Capturing Interactions Among Concurrently Executing Applications", [Online], 2006, pp. 157-163, [Retrieved from Internet on Oct. 31, 2019), <http://delivery.acm.org/10 .1145/1130000/1 128043/p157-ozturk.pdf?ip= 151.207.250 .22&id=1128043&acc=ACTIVE%20SERVICE&key=C15944E5 > (Year: 2006).

Pau et al, "High-Level Specification and Logic Implementation of Single-Chip Multiprocessor Systems Based on a Configurable Router", [Online], 2008, pp. 1039-1044, [Retrieved from Internet on Oct. 31, 2019], <https://ieeexplore.ieee.org/stamp/stamp.jsp?tp=&arnumber= 4564695> (Year: 2008).

Wu et al, "Design and Implementation of Real-time Signal Processing Applications on Heterogeneous Multiprocessor Arrays", [Online], 2010, pp. 2121-2125, [Retrieved from Internet on Oct. 31, 2019], <https://ieeexplore.ieee.rgtstamp/starnp.jsp?tp=&arnumber= 5757924> (Year: 2010).

Extended European Search Report Application No. EP20216963.7, dated Apr. 30, 2021 (9 pages).

Office Action and Search Report from Chinese Application No. 201811023611.2, dated Jul. 5, 2021, 15 pgs.

Krishnan et al, "The Need for Fast Communication in Hardware-Based Speculative Chip Multiprocessors", [Online], 2000, pp. 3-33, [Retrieved from internet on Jun. 24, 2021], <https://link.springercom/content/pdf/10.1023/A:1026479803767.pdf> (Year: 2000) (Abstract included).

* cited by examiner

MULTIPROCESSOR PROGRAMMING TOOLKIT FOR DESIGN REUSE

PRIORITY CLAIM INFORMATION

This application is a continuation of U.S. patent application Ser. No. 16/818,007 filed on Mar. 13, 2020, now U.S. Pat. No. 11,163,558 B2, which is a continuation of U.S. patent application Ser. No. 15/872,421 titled "Multiprocessor Programming Toolkit for Design Reuse" and filed on Jan. 16, 2018, now U.S. Pat. No. 10,592,233, which claims benefit of priority of U.S. patent application Ser. No. 14/047,135 titled "Multiprocessor Programming Toolkit for Design Reuse" and filed on Oct. 7, 2013, now U.S. Pat. No. 9,904,542, which claims benefit of priority of U.S. Provisional Application No. 61/722,850, filed on Nov. 6, 2012. The disclosures of each of the above-referenced applications are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The field of this disclosure generally relates to software development for digital electronic systems and more specifically, to programming techniques for multiprocessor arrays.

DESCRIPTION OF THE RELATED ART

Increasingly, digital electronic systems utilize one or more multiprocessor arrays (MPAs). Examples of digital electronic systems include: computers, digital signal processors (DSP), and these systems embedded in enclosing equipment, such as radio telephones, government service radios, consumer wireless equipment such as cellphones, smartphones and tablet computers, cellular base station equipment, video processing and broadcast equipment, object recognition equipment, hyper-spectral image data processing, etc.

A MPA may be loosely defined as a plurality of processing elements (PEs) (i.e., processors), supporting memory (SM), and a high bandwidth interconnection network (IN). The term "array" in the MPA context is used in its broadest sense to mean a plurality of computational units (each containing processing and memory resources) interconnected by a network with connections available in one, two, three, or more dimensions, including circular dimensions (loops or rings). Note that a higher dimensioned MPA can be mapped onto fabrication media with fewer dimensions. For example, a MPA in an IN with the shape of a four dimensional (4D) hypercube can be mapped onto a 3D stack of silicon integrated circuit (IC) chips, or onto a single 2D chip, or even a 1D line of computational units. Also low dimensional MPAs can be mapped to higher dimensional media. For example, a 1D line of computation units can be laid out in a serpentine shape onto the 2D plane of an IC chip, or coiled into a 3D stack of chips. A MPA may contain multiple types of computational units and interspersed arrangements of processors and memory. Also included in the broad sense of some MPA implementations is a hierarchy or nested arrangement of MPAs, especially a MPA composed of interconnected IC chips where the IC chips contain one or more MPAs which may also have deeper hierarchal structure.

MPAs present new problems and opportunities for software development methods and tools. Since MPAs may extend to thousands of PEs, there is a need to manage large amounts of software to operate the array, and to test, debug, and rebuild such software in efficient ways. Generally this requires modularity, hierarchy, adaptable module re-use, and automated build methods. While these ideas have appeared in conventional software development systems, they have not been integrated into development tools in a way that supports generalized modules that may be adapted statically and/or dynamically to a different number of PEs and other resources depending on performance requirements or a different shape or topology requirement that in turn may depend on resource availability or application requirements.

Accordingly, improved techniques and tools for multiprocessor array software development are desired.

SUMMARY

Various embodiments of techniques for developing software for a multiprocessor array or fabric and its use are provided below. The multiprocessor fabric may include a plurality of processors and a plurality of communication elements, and may be (generally) homogeneous or heterogeneous, as desired. Each communication element may be dynamically configurable and/or may include a plurality of communication ports, a memory, and/or a routing engine, among other possible elements. Each processor may include means for performing arithmetic logic, an instruction processing unit, and/or a plurality of processor ports, among other possible elements. The communication elements and processors may be coupled together in an interspersed manner. For example, for each of the processors, a plurality of processor ports may be configured for coupling to a first subset of the plurality of communication elements, and for each of the communication elements, a first subset of communication ports may be configured for coupling to a subset of the plurality of processors and a second subset of communication ports may be configured for coupling to a second subset of the plurality of communication elements.

In some embodiments, a software programming language toolkit may specify and implement a software application targeted for execution on a multiprocessor array (MPA). In one embodiment, software code may include first program instructions executable to perform a function. In this embodiment, the software code may also include one or more language constructs that are configurable to specify one or more communication ports and one or more parameter inputs. In this embodiment, the one or more communication ports are configurable to specify communication with other software code. In this embodiment, the one or more parameter inputs are configurable to specify a set of hardware resources usable to execute the software code. In this embodiment, the hardware resources include multiple processors and may include multiple supporting memories. In this embodiment, instances of the software code are deployable on an MPA to perform the function in different software applications. Each instance may include configuration of the software constructs. In some embodiments, the one or more parameter inputs may be configurable to specify operation of the first function, a data stream size, an amount of data used to store temporary state, and amount of communication resources, external inputs and/or outputs etc. The software code may be included on a non-transitory computer-accessible memory medium.

Various functionality may be implemented as a programming language, or an extension to an existing programming language, e.g., an extension to C or C++, among others. The multiprocessor array may include a plurality of processing elements, supporting memory, and a high bandwidth interconnection network (IN), communicatively coupling the plurality of processing elements and supporting memory. A software programming language toolkit may include functions for implementing a cell model (e.g., using the software code embodiment described above), which may provide for: cell based hierarchical design, cell reuse, and allocation of physical resources of the MPA. The physical resources may include processing elements, communication resources, and memory. Cells, and thus the allocation of array resources, may be configured or modified statically or dynamically, and thus may provide a highly flexible and effective tool for configuring software applications for execution on MPAs.

BRIEF DESCRIPTION OF THE DRAWINGS

A better understanding of the present disclosure can be obtained when the following detailed description of the preferred embodiment is considered in conjunction with the following drawings, in which.

Figure 1:
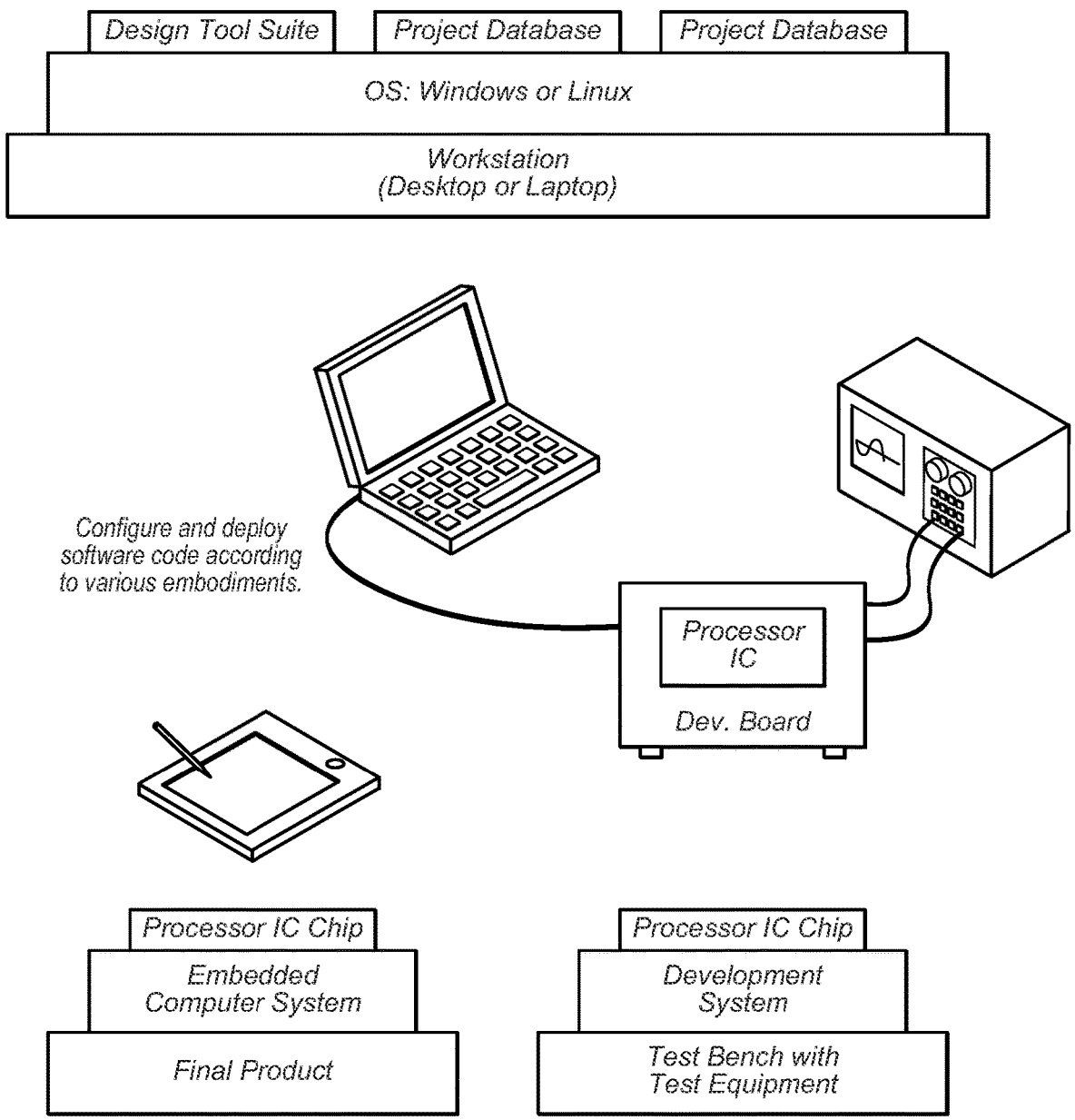
FIG. 1 illustrates one embodiment of an exemplary development system.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION OF EMBODIMENTS

Incorporation by Reference

The following patent is hereby incorporated by reference in its entirety as though fully and completely set forth herein:

U.S. Pat. No. 7,415,594 titled "Processing System with Interspersed Stall Propagating Processors and Communication Elements filed on Jun. 24, 2003, whose inventors are Michael B. Doerr, William H. Hallidy, David A. Gibson, and Craig M. Chase.

U.S. patent application Ser. No. 13/274,138, titled "Disabling Communication in a Multiprocessor System", filed Oct. 14, 2011, whose inventors are Michael B. Doerr, Carl S. Dobbs, Michael B. Solka, Michael R Trocino, and David A. Gibson.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although ASIC may contain programmable processor cores as building blocks. Cell phone cell, MP3 player chip, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Development Process—refers to the life-cycle for development based on a methodology. At a coarse level it describes how to drive user requirements and constraints through design, implementation, verification, deployment, and maintenance.

Processing Element—the term "processing element" (PE) is used interchangeably with "processor" and refers to various elements or combinations of elements configured to execute program instructions. Processing elements include, for example, circuits such as an ASIC (Application Specific Integrated Circuit), entire processor cores, individual processors, and programmable hardware devices such as a field programmable gate array (FPGA).

Overview

This disclosure initially describes, with reference to FIGS. 1-5A, an overview of software development for MPAs which may include embodiments of techniques disclosed herein. It then describes embodiments of cell-based software development techniques with reference to FIGS. 5B-11. Various techniques disclosed herein may allow flexible design re-use in the MPA context.

The following describes various embodiments of a tool or toolkit, such as a programming language or programming language extension, for multiprocessor array (MPA) software development, including program instructions or commands specific to design, development, and implementation of software targeted for execution on MPA systems. A MPA generally includes a plurality of processing elements, supporting memory, and a high bandwidth interconnection network (IN). Other terms used to describe a MPA may include a multiprocessor fabric or a multiprocessor mesh. In some embodiments, a MPA (or fabric/mesh) is a plurality of processors and a plurality of communication elements, coupled to the plurality of processors, where each of the plurality of communication elements includes a memory.

The toolkit may be used to implement modular, hierarchical design reuse of functions executing on multiprocessor arrays, and thus may allow a designer to create generalized functional cells that can be configured and used in many different designs (or multiple times in the same design) thereby saving the effort needed to manually create situation-specific versions of the cells. This approach may be referred to herein as a "cell model" (CM), although this terminology is exemplary only, and is not intended to limit the approach to any particular form, function, or appearance, and thus any other name or names may be used as desired. The toolkit may allow configuration of: communication between cells, an amount of hardware usable to execute cell functionality, cell hierarchy, etc.

It should be noted that the techniques disclosed herein may be used in MPAs of various different array sizes. For example, in one exemplary embodiment, the MPA may include three or more PEs. In other exemplary embodiments, the size (number of PEs, supporting memory, and associated communication resources in the array) of the MPA may be greater than or equal to some specified number, which in various different embodiments may have any value desired, e.g., 4, 8, 16, 24, 32, 64, etc. More generally, depending on the particular application or use, the number of PEs in the MPA may have a specified lower bound, which may be specified to be any plural value, as desired.

Software Development for MPAs

A software development project is the combination of human and machine work to generate the software that causes some product or service to operate according to the requirements taken on by the development team. Generally, more design and test automation is beneficial because it allows for more testing of the generated software and thus may eliminate more bugs.

A software development environment for embedded systems is pictured in FIG. 1. Apart from the human software engineers and programmers, FIG. 1 shows three main parts to the development environment: the final product, the workstation, and the test bench. In various embodiments, software code may be configured on a workstation and deployed on a MPA.

In some embodiments, the final product specifies at least a list of technical requirements. In some embodiments, a test bench is configured to generate test pattern inputs for the device under test (DUT) and capture the outputs of the DUT and compare to known good patterns. The closer the DUT matches the final product the higher is the confidence that the developed software will operate as expected in the final product.

A workstation may be a desktop or laptop computer, for example, with an operating system (OS) that manages the details of mass storage, a database of design data, and a set (or suite) of design tools that read and write the project database. There may be more than one project and more than one project database and tools and libraries can be shared between them to lower development costs.

Typically, the memory for computers and DSPs is organized in a hierarchy with fast memory at the top and slower but higher capacity memory at each step down the hierarchy. In some embodiments of a MPA, supporting memories at the top of the hierarchy are located nearby each PE. In some embodiments, each supporting memory may be specialized to hold only instructions or only data. In other embodiments, supporting memories may store both instructions and data. Supporting memory for a particular PE may be private to that PE or shared with other PE.

Further down the memory hierarchy there may be a larger shared memory (e.g., semiconductor SDRAM) with a bit capacity many times larger than that of the supporting memory adjacent to each PE. In some embodiments, storage elements such as flash memory, magnetic disks, or optical disks may be accessible further down the memory hierarchy.

Figure 2:
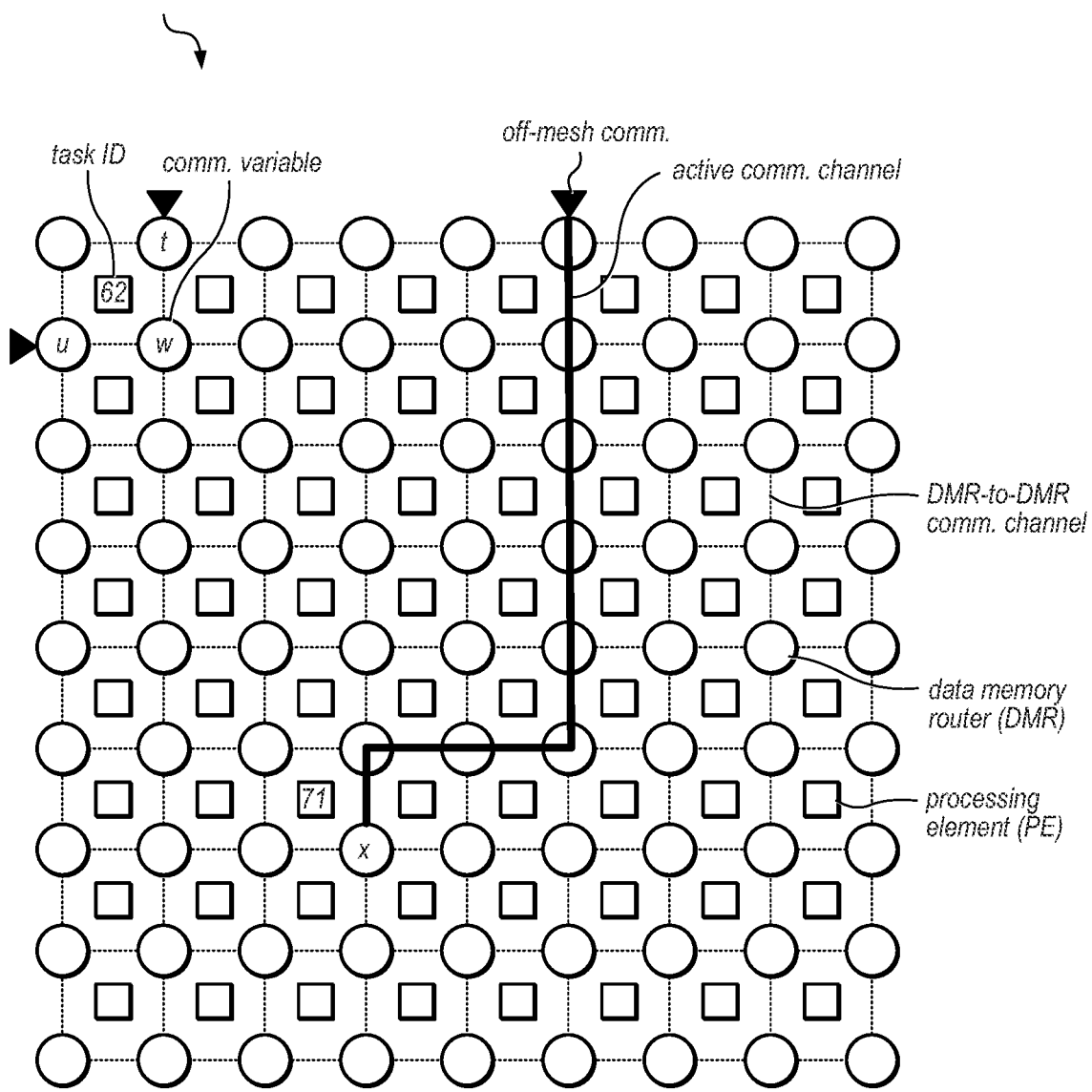
FIGS. 2 and 3 illustrate embodiments of exemplary multiprocessor array (MPA) systems.
Figure 3:
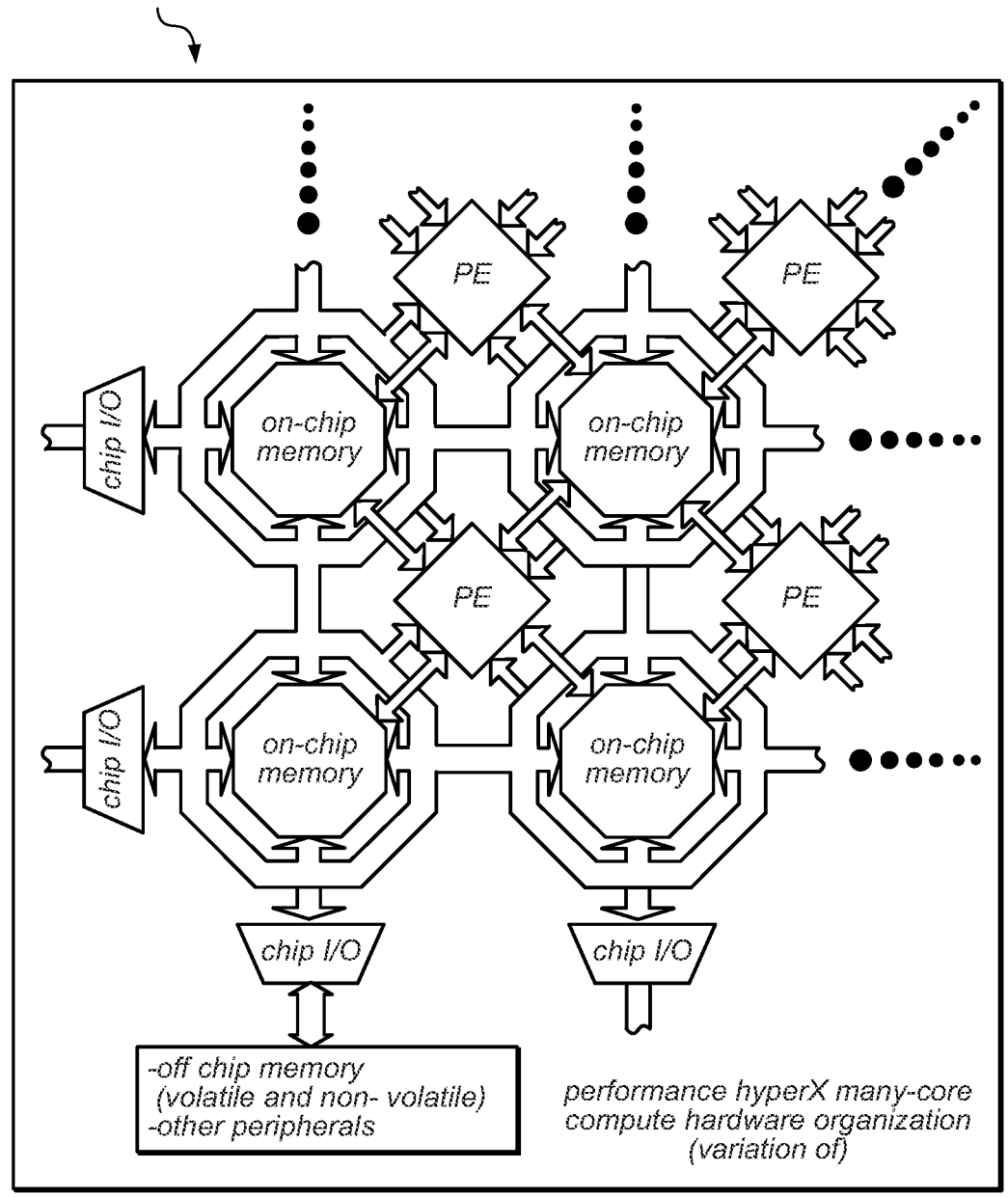

As noted above, a multiprocessor array (MPA) in some embodiments includes an array of processing elements (PEs), supporting memories (SMs), and a primary interconnection network (PIN or simply IN) that supports high bandwidth data communication among the PEs and/or memories. Exemplary MPAs are illustrated in FIGS. 2 and 3, described below. In some embodiments, a PE has registers to buffer input data and output data, an instruction processing unit (IPU), and means to perform arithmetic and logic functions on the data, plus a number of switches and ports to communicate with other parts of a system. In these embodiments, the IPU fetches instructions from memory, decodes them, and sets appropriate control signals to move data in and out of the PE and to perform arithmetic and logic functions on the data. PEs suitable for large MPAs are often selected or designed to be more energy efficient than general purpose processors (GPP), because of the large number of PEs per IC chip that contains a large MPA.

As used herein, the term MPA covers both relatively homogeneous arrays of processors, as well as heterogeneous collections of general purpose and specialized processors that are integrated on so-called "platform IC" chips. Platform IC chips also typically have many kinds of I/O circuits to communicate with many different types of other devices.

One example MPA architecture is the HyperX™ architecture discussed in U.S. Pat. No. 7,415,594. In one embodiment of the HyperX™ architecture, a multiprocessor array with a wide range of sizes may be composed of a unit-cell-based hardware fabric (mesh), wherein each cell is referred to as a HyperSlice. The hardware fabric may be formed by arranging the unit-cells on a grid and interconnecting adjacent cells. Each HyperSlice may include one or more data memory and routers (DMRs) and one or more processing elements (PEs). In U.S. Pat. No. 7,415,594 a DMR is referred to as a dynamically configurable communication (DCC) element, and a PE is referred to as a dynamically configurable processing (DCP) element. In this embodiment, the DMR may provide supporting memory for its neighboring PEs, as well as routers and links for the interconnection network (IN).

The hardware fabric may be created by abutting HyperSlices together, which involves aligning the HyperSlices to form correct electrical connections. These connections include links to DMRs and connections to a power supply grid. The techniques of replicating the HyperSlices, aligning them, and connecting by abutment are well understood techniques of very large scale integration (VLSI) of integrated circuits (IC) chips, especially ICs fabricated with complementary metal oxide semiconductor (CMOS) circuit technology. In this embodiment, the hardware fabric has a PIN that operates independently and transparently to the processing elements, and may provide on-demand bandwidth through an ensemble of real-time programmable and adaptable communication pathways (which may be referred to as routes or channels) between HyperSlices supporting arbitrary communication network topologies. Coordinated groups of HyperSlices may be formed and reformed "on-the-fly" under software control. This ability to dynamically alter the amount of hardware used to evaluate a function may allow for efficient or optimal application of hardware resources to relieve processing bottlenecks. At the edge of the hardware fabric, links may connect to circuits specialized for types of memory that are further down the memory hierarchy, or for I/O at the edge of an integrated circuit (IC) chip.

The interconnected DMRs may provide nearest-neighbor, regional, and global communication across the chip and from chip to chip. Each of these communication modes may physically use the DMR resources to send data/messages differently depending on locality of data and software algorithm requirements. A "Quick Port" facility may be provided to support low latency transfer of one or more words of data from a processor to any network destination. For block transfers, Direct Memory Access (DMA) engines within the DMR may be available to manage the movement of data across the memory and routing fabric. For nearest-neighbor communication between PEs, the use of shared memory and/or registers may be the most efficient method of data movement. For regional and global data movement, using the routing fabric (the PIN) may be the most efficient method. Communication pathways (or routes) can either be dynamic or static. Dynamic routes may be set up for data transfer and torn down upon the completion of the transfer to free up PIN resources for other routes and data transfers. Static routes may remain in place throughout the program execution and are primarily used for high priority and critical communications. The physical location of communication pathways and the timing of data transfers across them may be under software program control. Multiple communication pathways may exist to support simultaneous data transfer between any senders and receivers.

The architecture of the DMR may allow different interchangeable PEs to be used in a multiprocessor fabric to optimize the system for specific applications. A HyperX™ multiprocessor system may comprise either a heterogeneous or homogeneous array of PEs. A PE may be a conventional processor, or alternatively a PE may not conform to the conventional definition of a processor. A PE may simply be a collection of logic gates serving as a hard-wired processor for certain logic functions where programmability is traded off for higher performance, smaller area, and/or lower power.

FIG. 2 illustrates a view of the network of processing elements (PE's) and Data Memory Routers (DMRs) of one exemplary embodiment of a HyperX™ system. The PE's are shown as rectangular blocks and the DMRs are shown as circles. The routing channels between DMRs are shown as dotted lines. In the illustrated embodiment, solid triangles show off-mesh communication (which may also be referred to as chip inputs and/or outputs) and solid lines show active data communication between DMRs. A computational task is shown by its numerical identifier and is placed on the PE that is executing it. A data variable being used for communication is shown by its name and is placed on the DMR that contains it. In the illustrated example, the top left PE has been assigned a task with task ID 62, and may communicate with other PEs or memory via the respective DMRs adjacent to the PE, designated by communication path variables t, w, and u. As also shown, in this embodiment, an active communication channel connects a PE designated 71 (e.g., another task ID) to an off-mesh communication path or port. In some embodiments, PEs may communicate with each other using both shared variables (e.g., using neighboring DMRs) and message passing along the IN. In various embodiments, software modules developed according to the techniques disclosed herein may be deployed on portions of the illustrated network.

FIG. 3 illustrates an exemplary multiprocessor system implemented on a chip. As shown, the chip includes multiple I/O routers for communication with off-chip devices, as well as an interior multiprocessor fabric, similar to the exemplary system of FIG. 2. A HyperX™ processor architecture may include inherent multi-dimensionality, but may be implemented physically in a planar realization as shown. The processor architecture may have high energy-efficient characteristics and may also be fundamentally scalable (to large arrays) and reliable—representing both low-power and dependable notions. Aspects that enable the processor architecture to achieve this performance include the streamlined processors, memory-network, and flexible IO. In some embodiments, the processing elements (PEs) may be full-fledged DSP/GPPs and based on a memory to memory (cacheless) architecture sustained by a variable width instruction word instruction set architecture that may dynamically expand the execution pipeline to maintain throughput while simultaneously maximizing use of hardware resources.

In the illustrated embodiment, the multiprocessor system includes MPA inputs/outputs which may be used to communicate with general-purpose off-mesh memory (e.g., one or more DRAMs in one embodiment) and/or other peripherals.

Software is the ensemble of instructions (also called program code) that is required to operate a computer or other stored-program device. Software can be categorized according to its use. Software that operates a computer for an end user for a specific use (such as word processing, web surfing, video or cell phone signal processing, etc.) may be termed application software. Application software includes the source program and scripts written by human programmers, a variety of intermediate compiled forms, and the final form called run time software may be executed by the target device (PE, microprocessor, or CPU). Run time software may also be executed by an emulator which is a device designed to provide more visibility into the internal states of the target device than the actual target device for the purposes of debugging (error elimination).

Figure 4:
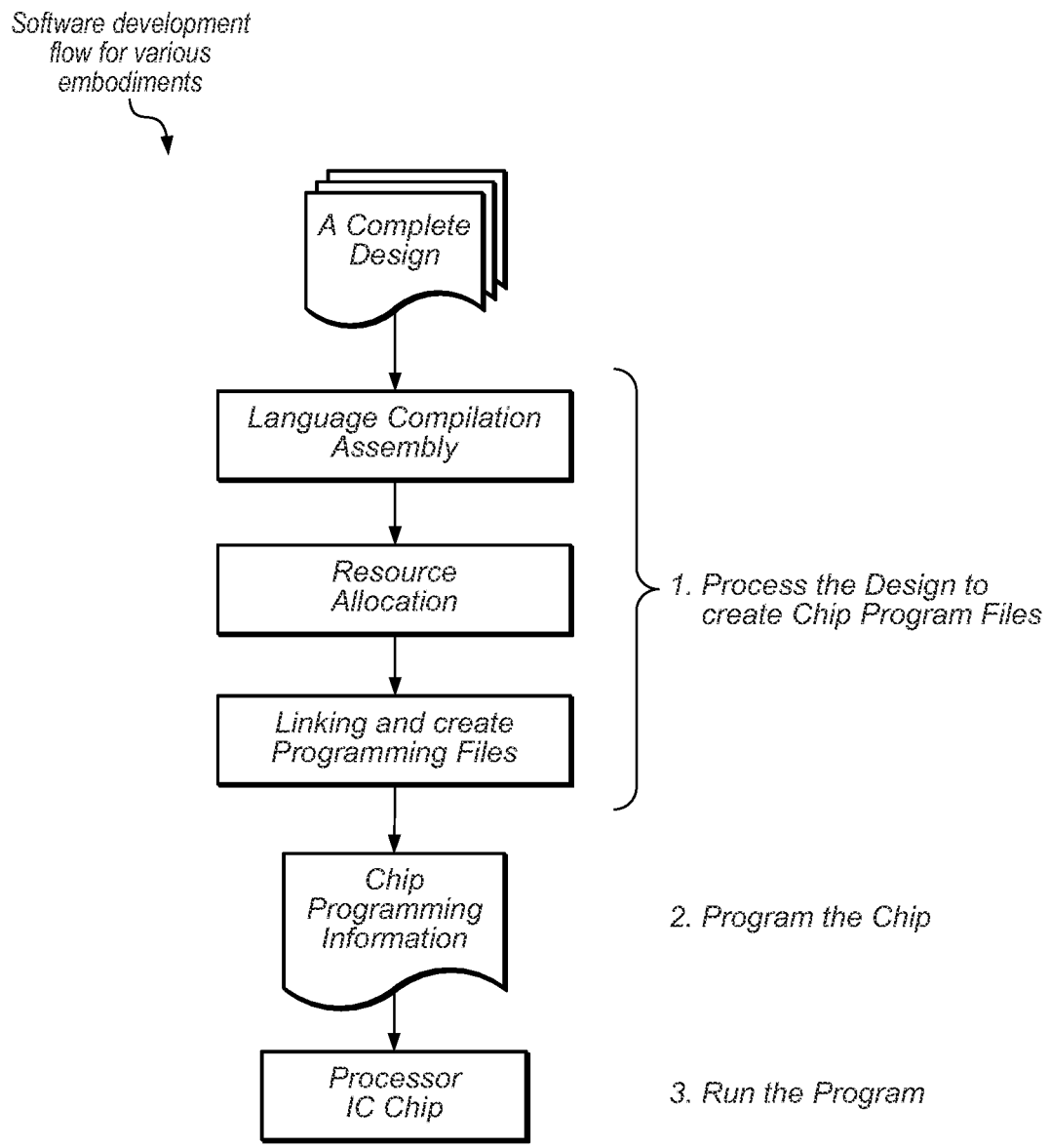
FIGS. 4 and 5A are flowcharts illustrating embodiments of software development flow for MPAs.

Development software (a group or suite of software development tools) is software used to generate application software. Basic development tools include a compiler, an assembler, and a linker, as indicated in FIG. 4, which illustrates an exemplary software design and development flow for a MPA based system. An editor whereby a user writes source code may also be considered to be a basic development tool. A human engineer or programmer typically designs a program and translates it to source code, represented by the documents of FIG. 4 labeled "a complete design", which may be created via a program editor. In the block labeled "language compilation/assembly", a compiler is used to translate source code into modular address-relocatable object code; an assembler is then used to create modular machine code; and finally, a linker is used to create an executable binary image of the entire program. This process of compiling, assembling, and linking (making a binary image), labeled "process the design to create chip programming files," may be automated with instructions to the operating system stored in "make files". To test the program, the binary image is typically loaded into the memory of the target device, represented in FIG. 4 by the provision and implementation of "chip programming information" to a "processor IC chip", i.e., "program the chip", and executed (i.e., "run the program"). Other common software tools include a debugger (to load, start, pause, dump, and disassemble the binary image from the target PE), and cycle-accurate simulators. Cycle accurate simulators provide complete visibility into the processor internal states but they run much slower than the target hardware, e.g., by factors of 10000 to a million.

For multiprocessors systems there is an important extra step compared to a single processor system, which is the allocation of particular processing tasks or modules to particular physical hardware resources—such as PEs and the communication resources between and among PEs and system I/O ports. Note that resource allocation may include allocation of data variables onto memory resources, because allocation of shared and localized memory may have an impact on allocation of the PE and communication resources, and vice versa. In FIG. 4 this extra step is represented by the block labeled Resource Allocation (which may also be referred to as physical design). The resource allocation part of the flow may utilize a placement and routing tool, which may be used to assign tasks to particular PE in the array, and to select specific ports and communication pathways in the IN. These communication pathways may be static after creation or dynamically changing during the software execution. When dynamic pathways are routed and torn down during normal operation, the optimization of the system can include the time dimension as well as space dimensions. Additionally, optimization of the system may be influenced by system constraints, e.g. run-time latency, delay, power dissipation, data processing dependencies, etc. Thus, the optimization of such systems may be a multi-dimensional optimization.

Figure 5A:
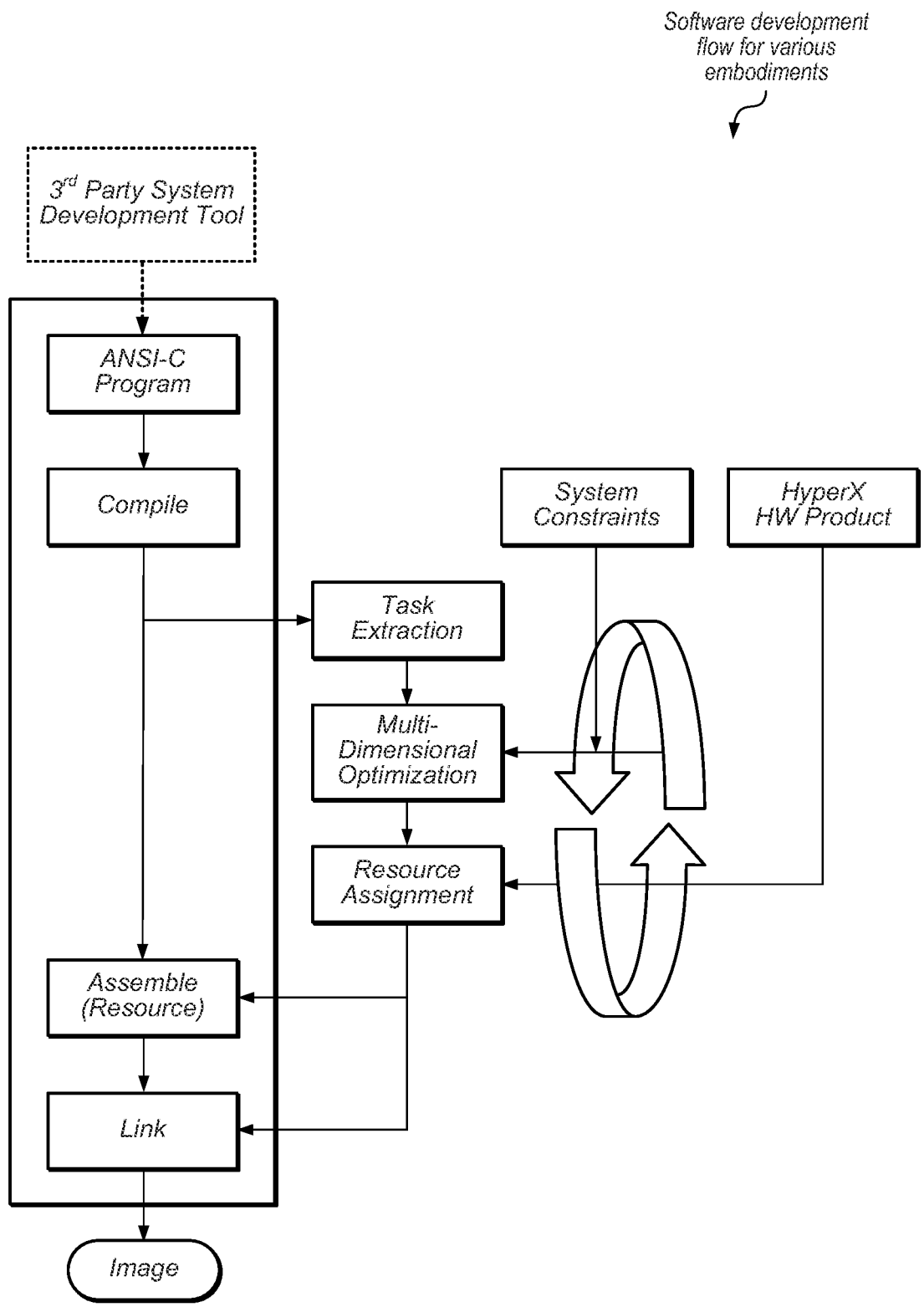

FIG. 5A illustrates a more detailed exemplary software design data flow. As may be seen, a third party system development tool is generally used to create a program, e.g., an ANSI-C program, which is compiled, assembled, and linked, to generate an image (binary executable). As also shown, the results of the compilation may be further utilized to optimize the software in light of the target hardware. More specifically, task extraction, multi-dimensional optimization (mentioned above), and resource assignment/allocation may be performed based on system constraints and the target hardware product, e.g., a HyperX™ hardware product, as indicated. As shown, this process may be iterative in nature.

When few processors are involved, the physical design (the assignment of application software tasks to physical locations and the specific routing of communication pathways) may be relatively simple and may be done manually. Even so, the work load of each processor may vary dramatically over time, so that some form of dynamic allocation may be desirable to maximize throughput. Further, for MPAs with large numbers of PEs, the physical design process can be tedious and error prone if done manually. To address these issues software development tools for multi-processor systems may define tasks (blocks of program code) and communication requirements (source and destination for each pathway) and automatically allocate resources to tasks (place and route). If a design is large or contains many repeated tasks it may be more manageable if expressed as a hierarchy of cells. However, a hierarchical description will generally have to be flattened into a list of all the tasks and all the communication pathways that are required at run time before the place and route tools can be used to complete the physical design.

The idea of hierarchical, configurable cells has been used in the area of Hardware Description Languages (HDLs). Hierarchical configurability is built into commonly used HDLs such as Verilog and VHDL. However, those methods are oriented toward creating designs that are implemented in logical gates and are not usually utilized in a multiprocessor array. The major differences are the models of computation used in each domain. In the HDL model, all the computation resources typically default to concurrent execution, but can be specified for sequential execution. The multiprocessor model typically assumes a restricted number of streams of parallel computation, each of which may follow a sequential execution model.

Such HDLs have no representations of the unique properties of multiprocessor arrays, e.g., unique or shared memory spaces, unique or shared synchronization resources, or sets of processor specific machine instructions. In contrast, software languages for multiprocessors typically include representations of these features.

In the field of software languages, function configurability has been utilized for some time. However, prior art software programming languages do not support programming reusability (of both fixed and reconfigurable cells) and managing design complexity with hierarchical decomposition. For example, the construct known as "templates" in C++ allows a function to be specialized for a particular use; however, the range of parameterization is limited to the data types of its arguments and does not allow changes in the parallel implementation of the computation, e.g., on a MPA.

Cell-Based Development Overview

In some embodiments, the cell model may enable the encapsulation and parameterization of parallel implementation of a function, which may allow the amount of parallelism employed in any particular use of the function to be expanded or contracted to fit the environment in which it is being used. For example, the techniques disclosed herein may allow the utilization of more hardware resources (through more parallelism) to construct a higher performance version of the cell.

In some embodiments, the cell model may allow the cell to operate on memory and synchronization resources that are defined external to the cell, and thus can be shared with other cells. This may further enable cell reuse because the cell can be shrunk to only encompass key functionality, and simpler and more functionally pure cells are easier to reuse. Generally, the cell model may include software constructs that allow specification of connectivity between a cell and other cells and/or an amount of communication resources available to a given cell.

The resource allocation of a cell on a MPA may also be sensitive to parameters. For example, a cell may be designed with a parameter that may determine whether it was laid out linearly or in a rectangular form. As another example, the parameter may represent a bounding box of the resources onto which the cell is designed to be allocated.

In some embodiments, parameters may be configurable to change operation of the function of a cell. For example, one some embodiments a parameter may be used to configure how many iterations of a process to run or set a convergence criterion for completion of a process. In another embodiment a parameter may be configurable to completely change the function of a cell, e.g., by selecting among a number of different algorithms available in the cell.

In some embodiments, the cell model may also be used to dynamically change the resources the cell is using as it is executing, e.g., by dynamically changing the amount of resources being used and/or changing the specific set of resources that are being used. For example, based on changing load conditions the cell may use more processors to complete computations in a timely manner. Another example is to change the amount of data used to store temporary state during computations based on the size of the data that is being communicated to the cell. A further example is to use more communication resources to more quickly get the data into the cell. Further, parameters may be used to provide a cell access to MPA inputs and/or outputs as well as one or more system memories external to the MPA.

In some embodiments, the allocation of the resources used by a particular cell may be changed dynamically, e.g., when a cell expands it needs to allocate its additional resources onto the multiprocessor array. As another example, if a neighboring cell needs to expand and use more resources, the cell may minimize the resources it is using, or re-allocate the set of resources it is using in order to give the neighboring cell more room.

The programming language extensions disclosed herein, which may be referred to as "Multiprocessor Programming Language Extensions for Design Reuse (MPPLEDR)", may address design reuse and scalability to large numbers of PE. In various embodiments, the basis of scalability is a cell-based hierarchy approach in which parameterized cells may be designed and stored in one or more libraries for customizable re-use across many projects.

Exemplary programming constructs or programming language extensions disclosed herein are presented as an extension to the C language; however, it should be noted that other programming languages may be extended or defined in similar fashion, e.g., C++, Java, FORTRAN, and so forth, and that the C language based embodiments disclosed herein are meant to be exemplary only, and are not intended to limit the programming languages considered to any particular set of programming languages. In some embodiments, the programming language or programming language extensions disclosed may be used to create and instantiate cells.

Moreover, in some embodiments, the techniques disclosed herein may provide or facilitate a tool flow that implements the cells and instantiations onto a multiprocessor array. In the description below, a cell created with the present techniques, e.g., language extension, is termed a "generalized cell." The generalized cells may be hierarchical, i.e., able to utilize other generalized cells as part of their definition, and the configuration of the sub-cells may be modified by the configuration of the parent cell.

Figure 5B:
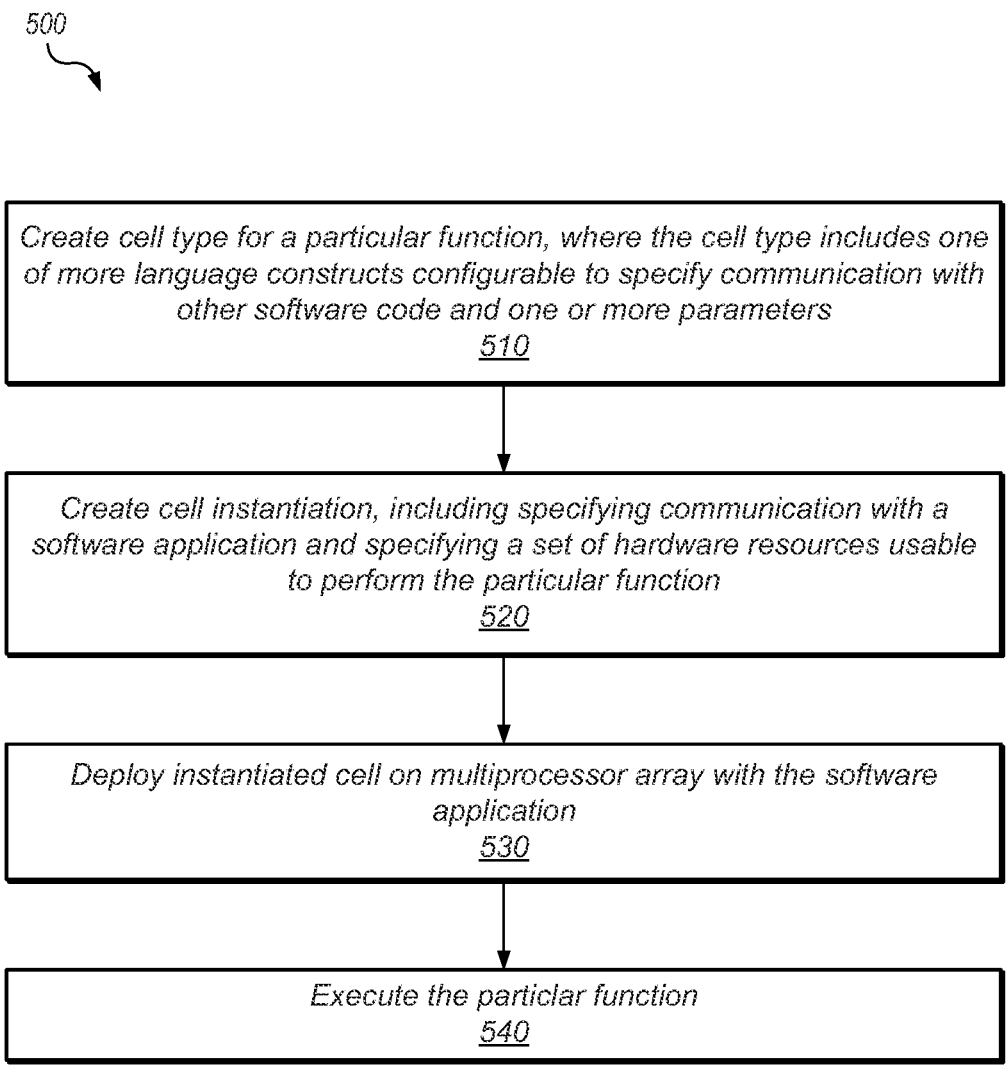
FIG. 5B is a flowchart illustrating another embodiment of software development flow.

FIG. 5B shows a flowchart illustrating one embodiment of a method for cell-based software development. In some embodiments, the steps of FIG. 5B may be performed as part of the processes of FIGS. 4 and 5A. The method shown in FIG. 5B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, a cell type or definition is created for a particular function. The particular function may be any of various functions such as a mathematical transform, for example. In this embodiment, the cell type includes one or more language constructs that are configurable to specify at least (1) communication with other software code and (2) one or more parameters. Exemplary software constructs are discussed with reference to code examples below. Creation of the cell type may be performed by a software developer for a particular application or as part of a library of cell types, for example, which may be available for creating various applications. In some embodiments, cell types or definitions may be created that do not include a particular function, but merely act as wrappers for other cells, for example. Flow proceeds to block 520.

At block 520, an instantiation of the cell is created. This step may be performed when writing a particular software application. The software application may include multiple cells of the same or of different types and may or may not include other software that does not conform to the cell model. In this embodiment, instantiating the cell includes specifying communication of the cell with the software application and specifying a set of hardware resources usable to perform the particular function. Specifying communication may include specifying communication with other cells and/or placement of a cell within other cells. In some embodiments, the software constructs may define communication ports. In one embodiment, the communication ports include one or more fabric ports (e.g., to an IN) and one of more shared memory ports (e.g. for communication using shared variables in a memory available to multiple PEs). Specifying communication may include specifying connections for such ports.

In some embodiments, creating a cell type (e.g., as in step 510) may include defining different hardware configurations for deployment of the cells. In these embodiments, specifying the set of hardware resources usable to perform the particular function may include providing a parameter in the cell instantiation that selects one of the defined hardware configurations. In other embodiments, specifying the set of hardware resources may not be based on a pre-defined configuration, but may define the set of hardware resources using parameters (e.g., by specifying a number of processors, communication resources, etc.). Flow proceeds to block 530.

At block 530, the instantiated cell is deployed on a multiprocessor array with the software application. This may include storing data and/or instructions on one or more memories and/or PEs that are part of the set of hardware resources and assigning PEs for execution of instructions to perform the particular functionality. Flow proceeds to block 540.

At block 540, the particular function is executed on the MPA. Execution of the particular function may have different performance characteristics depending on the amount of hardware resources specified in step 520. Further, assignment of hardware resources to the cell may be adjusted dynamically. In some embodiments, dynamic adjustment may be based on information from other cells (e.g., neighboring cells on the MPA) about their use of hardware resources. Thus, the cell may also be configured to communicate its resource usage to other cells. Flow ends at block 540.

Figure 6:
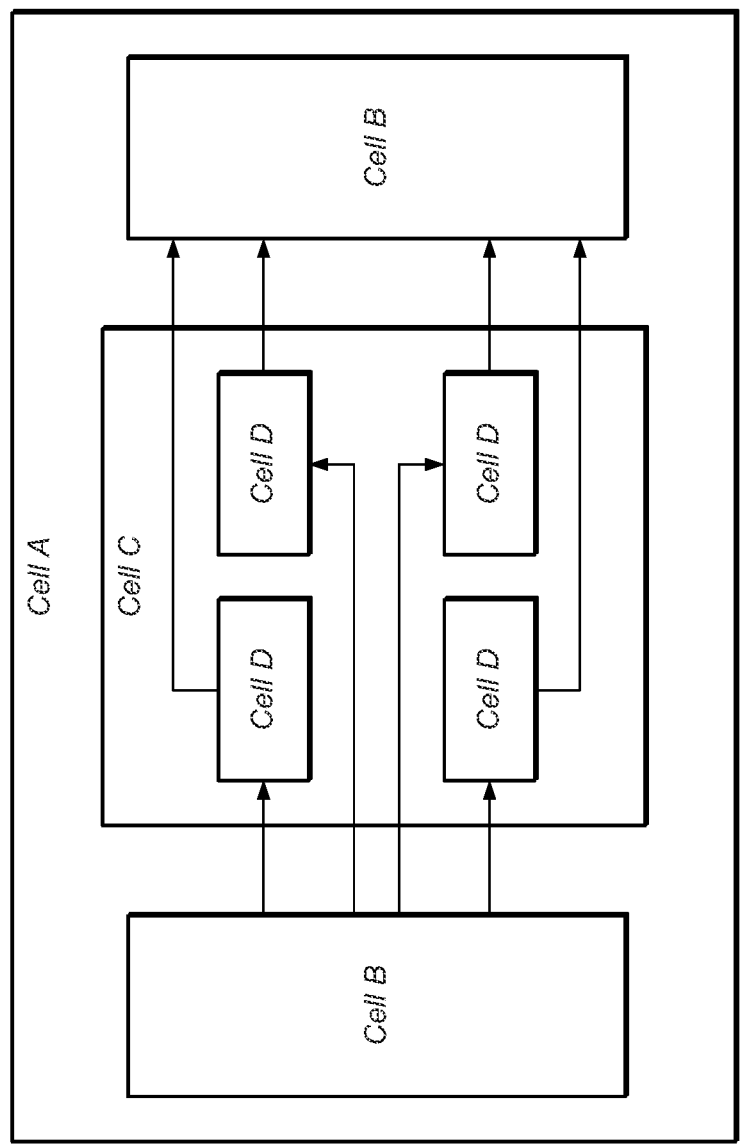
FIG. 6 illustrates a cell hierarchy, according to one embodiment.

FIG. 6 illustrates an exemplary hierarchy of cells, according to one embodiment, in which a cell A includes and uses cells B (two instances), C, and D, and where cell C includes and utilizes cell D (four instances). Such modular hierarchies may facilitate complex functional and architectural schemes, as well as module reuse. Such hierarchies of generalized cells facilitate highly configurable solutions for parallelizing execution of software applications on MPAs.

Figure 7:
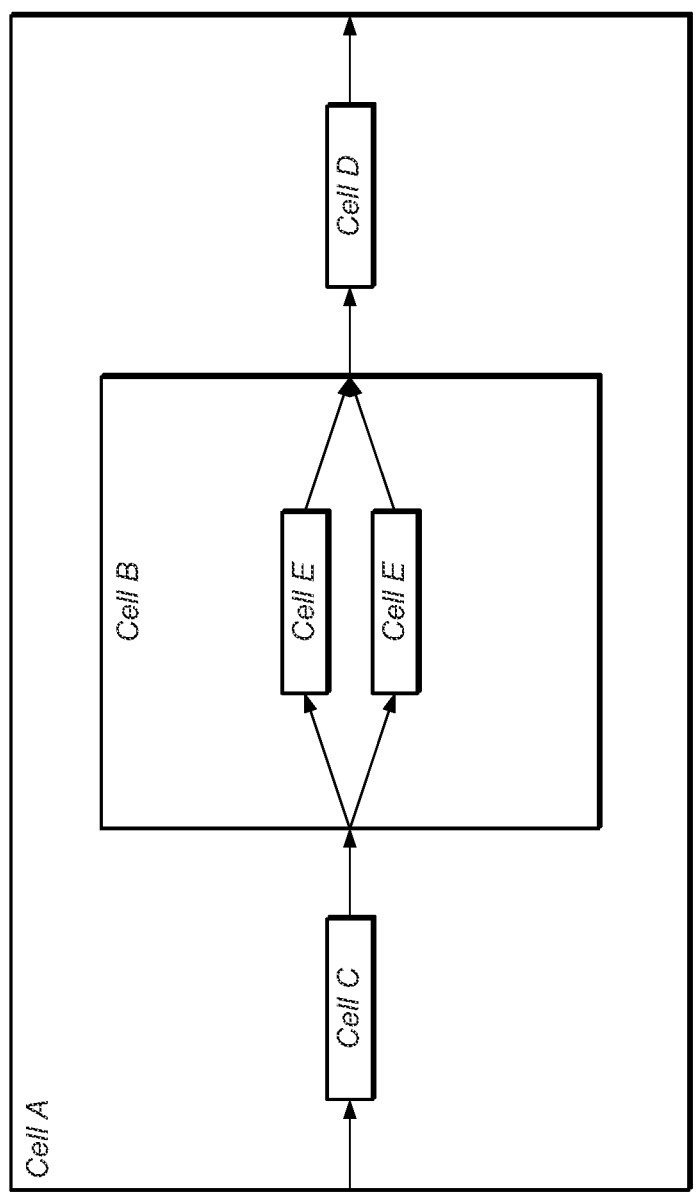
FIGS. 7 and 8 illustrate respective parameterized cell hierarchies, according to one embodiment.
Figure 8:
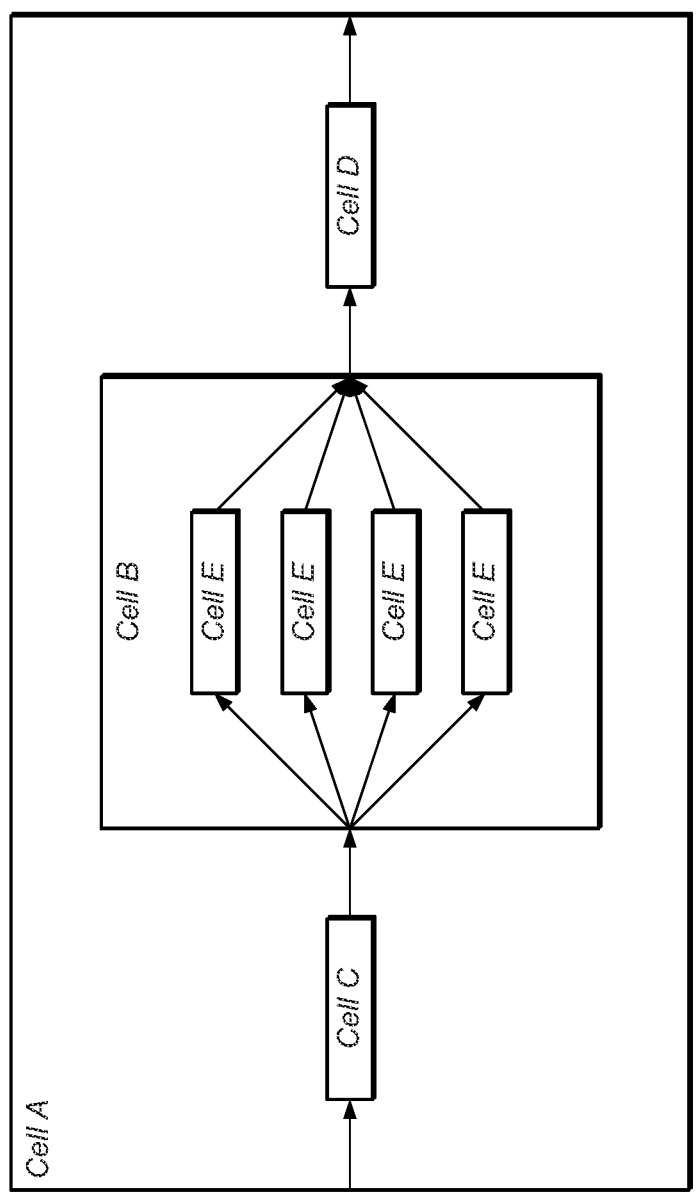

For example, FIG. 7 illustrates an exemplary cell hierarchy comprising cell A, cell B, cell C, cell D, and cell E. Cell B is an example of a parameterized cell, and is parameterized to include two sub cells, in this case, two instances of cell E. FIG. 8 illustrates a modified version of the cell hierarchy of FIG. 7, according to one embodiment. As may be seen, in this example, cell B has been parameterized to include four sub cells, specifically, four instances of cell E, thereby providing increased parallelism of cell B's tasks via additional sub cells. In other embodiments, a sub cells tasks may be parallelized by configured hardware resources available to a particular sub cell, using a parameter for example. In some embodiments, a parameter configurable to change the number of sub cells in Cell B may be numeric, e.g., indicating the number of instances of Cell E to include. In other embodiments, a parameter configurable to change the number of sub cells in Cell B may indicate or reference an instance or type of Cell E (e.g., Cell B may not include information associated with Cell E, but this information may be passed as a parameter). In some embodiments, a cell may not include code indicating any particular functionality, but may serve as a wrapper for other cells that may be plugged in to perform different configurable functionalities.

The configuration or parameterization of the generalized cell may be used to configure or modify the logical and/or functional operation of the cell. A generalized cell may utilize zero or more processors in the multiprocessor array, and the cell configuration information may change the number of processors that the cell utilizes. Similarly, a generalized cell may utilize zero or more components of the primary interconnection array and the cell configuration information may change the number of components of the interconnection network (IN) that the cell utilizes. Similarly, a generalized cell may utilize zero or more storage locations in the MPA's supporting memory and the cell configuration information may change the number of storage locations that the cell utilizes.

The definition of the generalized cell may also include information that controls the physical realization of the cell, and the physical realization may be modified by changing the configuration. The physical realization may, for example, include the exact or relative processors used, the methods and realization of processor-to-processor communication, and the location of the functional variables in the array memory or memories.

Figure 9:
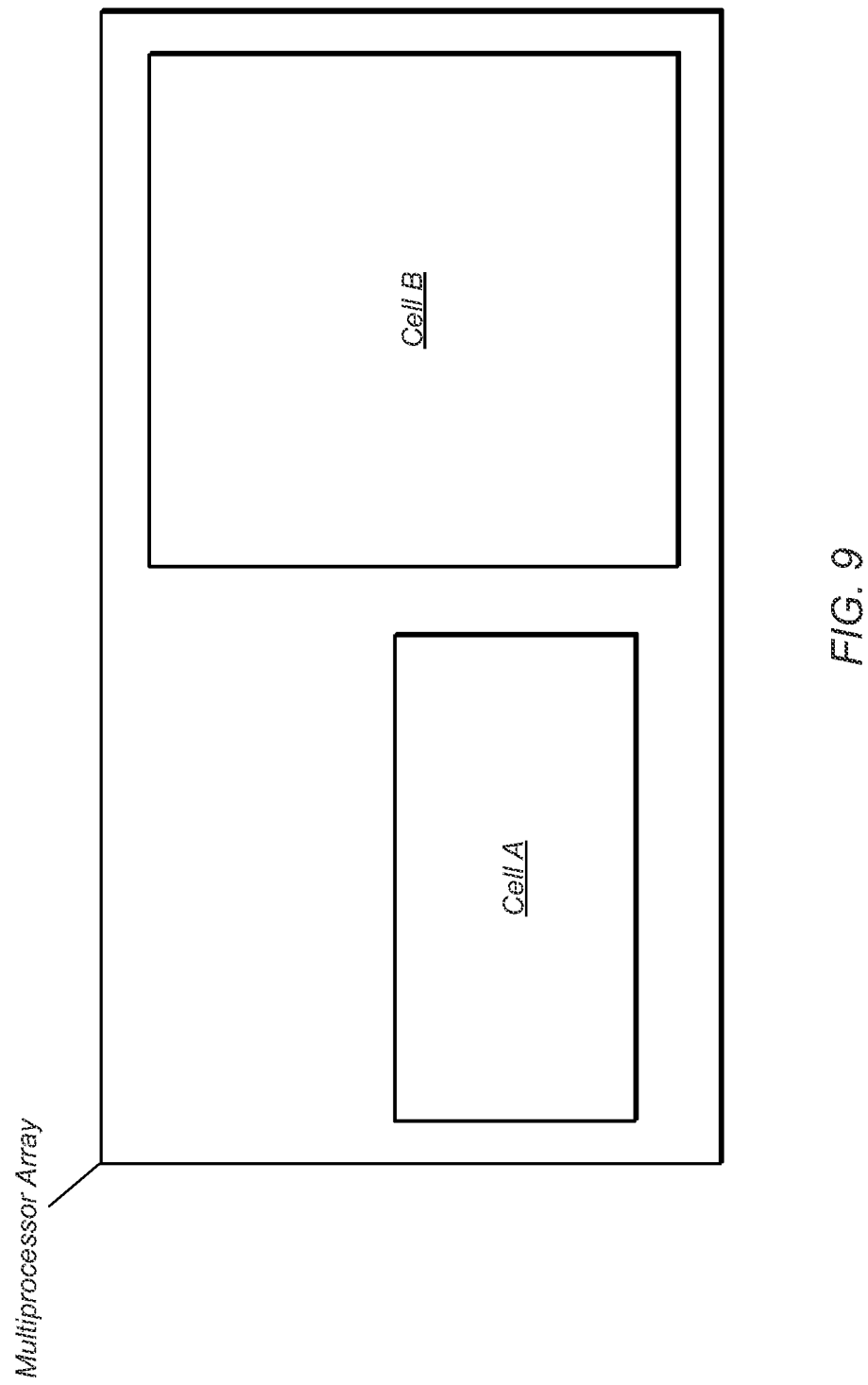
FIGS. 9 and 10 illustrate respective physical resource allocations for a pair of cells, according to one embodiment.
Figure 10:
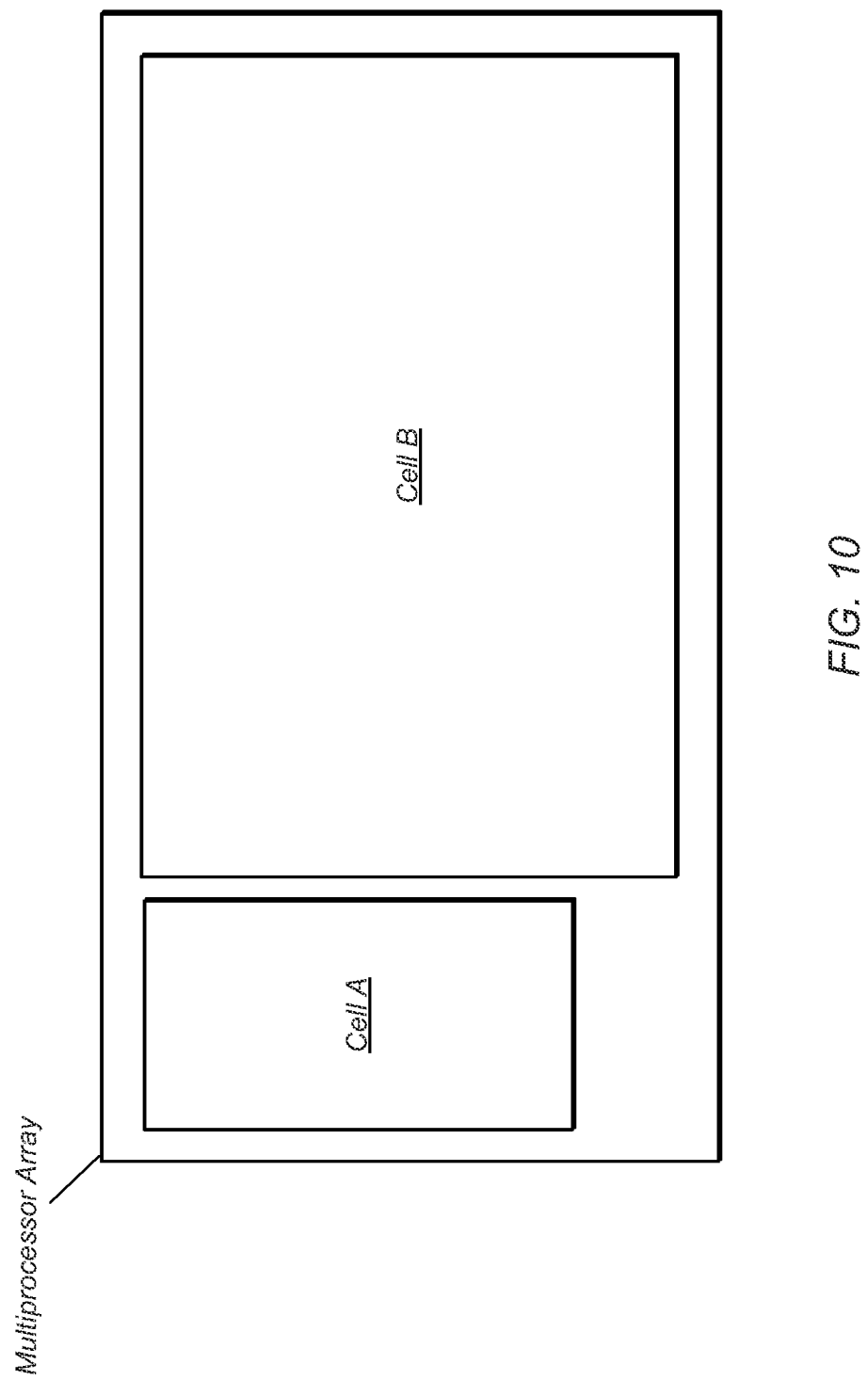

FIGS. 9 and 10 illustrate two cells (cells A and B) physically occupying respective parts of a MPA. In these figures the area of the each cell is intended to represent the processing and/or memory resources used. More specifically, FIG. 9 illustrates respective resource usage for cell A and cell B according to a first configuration (or parameterization), where, as may be seen, cell B utilizes more of the multiprocessor array resources than cell A. FIG. 10 illustrates respective resource usage for cell A and cell B according to a second configuration (or parameterization), in which resources for the cells of FIG. 9 have been re-allocated such that cell A changes shape and location when cell B expands. Note that in this new configuration, cell B utilizes much more of the multiprocessor array resources than cell A, and substantially more than Cell B with the configuration of FIG. 9. This re-allocation may be dynamic (e.g., while a software application that contains cell's A and B is executing) or may be performed during development of a program (e.g., cells A and B may be deployed using different amounts of hardware resources in different applications).

In one embodiment, language construct or parameters may allow a cell to share memory or synchronization resources (e.g., semaphores) with neighboring cells or functions running on neighboring processors. It should be noted that the techniques disclosed herein, including embodiments of the cell model and its use, applies to any of various MPA architectures, both homogeneous and heterogeneous.

Exemplary Embodiments and Implementations

The following describes various exemplary embodiments and implementations of the techniques disclosed herein. However, it should be noted that the particular embodiments and techniques described do not limit the invention to any particular form, function, or appearance. For example, some of the embodiments are described in terms of an extension to the C programming language, with C-type data structures, syntax, and specific function, structure, or element names; however, the techniques described may be implemented in or as any of various programming languages (or extensions to such languages), may use any syntax and names, as desired.

Cells

A generalized cell may be defined for scalable hierarchical designs on MPAs. The basis of scalability is a cell-based hierarchy approach in which parameterized cells may be designed and stored in one or more libraries, sets, or collections, for customizable re-use across many projects, in some embodiments.

Cells may be components used to build a hierarchical design. A cell may include one or more tasks or functions as well as instances of other cells. Cells may implement an abstract functionality which can be as simple as a pass-thorough (one input, one output communication structure) or as complex as (or more complex than) a matrix multiplication or Viterbi decoder, for example.

In one embodiment, a cell may have two major parts: a cell definition and a view. The multiprocessor cell definition construct may define the cell name and an ordered list of port and parameter names and their types. Ports are the channels for communication of data between the cell and other cells or the outside world. Parameters configure the cell and are bound to constant values when the cell is instantiated.

In one embodiment, an exemplary cell definition construct may be defined according to the following syntax:

```
mpx_celldef cellname {
    mpx_param int P;
    mpx_input in;
    mpx_output out;
    mpx_shared int sharedvar;
}
```

As may be seen, the above exemplary cell definition construct mpx_celldef includes the cell name and a list of the cell's ports and parameters.

Views

A view (which may have a different name as desired) may be defined by a view definition, e.g., using a view definition construct, e.g., mpx_view construct. The view definition construct may define the view name, tasks, and possibly instantiation of other cells. More generally, a view may define the body of the cell, and may contain leaf tasks. A view may also contain instances of other cells. In some embodiments, a cell can have multiple views. Each view of a cell may be independent of any other views.

Views provide the cell's functionality, and can be implemented in different ways depending upon the system requirements. Reasons for different implementations may include, but are not limited to, latency and throughput requirements, PE instruction memory availability, DMR data memory availability, and routing congestion, among others.

Thus, different implementations of the cell may be defined as views, using a view definition construct, e.g., mpx_view. Each view implementation or instance may have its own file. In one embodiment, an exemplary view definition construct may be defined according to the following syntax:

```
mpx view viewname() {
    if (MPX_RANK == 0) {
        // code. . .
    }
}
```

The terms "rank" and "MPX_PARALLEL" (mentioned below) are particular semantics of an exemplary implementation of the hierarchical functionality of the present techniques. Per the definitions used herein, cells may have functionality and instantiate other cells. Functionality may be created through tasks, and other cells may be instantiated using the MPX_PARALLEL construct. As used herein, a task is a piece of functionality, e.g., a function, block of code, or set of program instructions, that is executed on a processor, and rank is an assigned unique identifier for the task. Tasks may, by default, execute concurrently with all other tasks executing on other processors. If more than one task is assigned to the same processor, provisions may be made to execute the multiple tasks on the processor—extensive art exists describing multi-tasking mechanisms. A special rank identifier, MPX_PARALLEL, provides a convenient syntactic means of importing other cells and all their tasks into the current view, thereby instantiating separately defined sets of multiple tasks collectively declared as cells in this embodiment. Said in a slightly different way, a task is a piece of functionality that is executed on a processor, and rank is a means of creating different tasks for instantiated cells depending upon the particular processor where they are eventually located. An MPX_PARALLEL rank is a special rank in which other cells are instantiated. It should be noted, however, that the term "rank" may not only apply to MPX_PARALLEL (or functional equivalents); rather, in some embodiments, a rank may be a serial task or a block of parallel cell instances. In this embodiment, the predefined rank symbol MPX_PARALLEL specifies that the statements contained within are concurrent statements and not serial statements.

It should be noted that in some embodiments, the hierarchical system may be implemented without any tasks, but only instantiations of other cells Ports Communications between tasks in the view and tasks that are outside of the view may be configured using the port interface. In one embodiment, a cell's port interface may declare two types of ports: comm ports and data ports.

In one embodiment, comm (short for communication path) ports may be declared with input, output, or port types, e.g., mpx_input, mpx_output, or mpx_port. Comm ports may be used for fabric communications while data ports may be used for shared variable communication, in some embodiments. Comm ports may be used for routed communications such as DMA transfers. In one embodiment, comm port types (e.g., mpx_port, mpx_input, mpx_output) may only be used in declarations of cell definitions (mpx_celldef), and may not be used to declare local or global variables or to declare function parameters. In some embodiments, arrays of comm ports may also be supported.

For example, an array of input comm ports may be declared according to the following exemplary syntax in one embodiment:

```
mpx_celldef cellname {
    mpx_input in[ SIZE ];
    mpx_output out;
};
```

Note that in some embodiments, the declared size of an array port may be required to be a constant or a previously declared parameter, i.e., a general variable may not be allowed.

In some embodiments, data ports may be declared with type qualifiers shared or semaphore, e.g., mpx_shared or mpx_semaphore, and may associate a shared variable or semaphore that is declared external to the cell with a local port symbol. Tasks in the cell's view may reference the port symbol to directly access the shared variable or semaphore.

Note that in some embodiments, the non-direction-specific mpx_port (or functional equivalent) may be supported. The final direction may be chosen by the implementation system. The scope of ports may be global within the cell declared using mpx_celldef (or functional equivalent). Ports may not need to be passed as parameters to functions called within the cell. In one embodiment, to be able to reference ports, the function may be required to be in the same file as the mpx_celldef. Cell ports may be used as a comm ID in send and receive APIs.

The exemplary type qualifiers mpx_shared or mpx_semaphore may declare data ports when used in an mpx_celldef declaration. A data port may provide access to a variable that is declared outside the cell. The declaration may be required have global scope, and so may not be allowed to be inside a function, cell definition (e.g., mpx_celldef or mpx_cell), or implementation (e.g., mpx_view).

The following illustrates an exemplary required external declaration according to one embodiment:

```
extern mpx_celldef cellA {
    mpx_input in;
    mpx_output out;
    mpx_shared int shv;
};
mpx_shared int shared Var = 0;
main()
{
    // . . .
    if (MPX_RANK == MPX_PARALLEL) {
        U1: cellA( 1000, 2000, sharedVar );
    }
}
```

In this examples, sharedVar is declared externally to the functionality or definition of cell A. Actual comm. symbols and shared variables associated with a cell instantiation may match the port positions in the formal cell definition. In the example above, a comm. with identifier 1000 is associated with the input comm. port "in", 2000 is associated with output comm port "out", and sharedVar is associated with the shared variable data port "shy". In another embodiment, the ports and parameters may be matched by name to the comm IDs and parameter values in the instantiation.

A variable declared with qualifier mpx_semaphore (or functional equivalent) may be used as a semaphore for controlling mutual exclusive access of shared resources. Semaphore variables, in some embodiments, whether declared as variables or data ports, may only be set using the MPX_Lock and MPX_Unlock functions (or functional equivalents) and may not be passed as parameters to other functions. Note that the techniques disclosed herein are not limited to any particular implementation of a semaphore; for example, in some embodiments, fetch and increment instructions may be utilized.

Example: Shared Memory

The following is an exemplary set of declarations regarding shared memory, according to one embodiment.

```
File: main.c
extern mpx_celldef cellA {
    mpx_input in;
    mpx_output out;
    mpx_shared int shv;
};
mpx_shared int shared Var = 0;
main()
{
    if (MPX_RANK == 0) {
        while ( sharedVar != 0)
            MPX_Nop(1);
        sharedVar = 1;
        . . .
    }
    if (MPX_RANK == MPX_PARALLEL) {
        U1: cellA( 1000, 2000, sharedVar );
    }
}
File: cellA.c
mpx_celldef cellA {
```

```
  mpx_input    in;
  mpx_output   out;
  mpx_shared int shv;
};
mpx_view cellA_view()
{
  if (MPX_RANK == 0) {
    while ( shv != 1)
      MPX_Nop(1);
    shv = 2;
    ...
  }
}
```

In the above declarations, the ports in and out are comm ports, and shy is a data port. Within cellA, shy is a reference to the shared variable declared and owned outside of the cell as sharedVar in main.c.

In some embodiments, data ports may be passed through multiple levels of the cell hierarchy. For example, the following instantiation of cellB within the viewA implementation of cellA passes shA through. Note that the shared variable sizes match in this example.

```
extern mpx_celldef cellB{
  mpx_input    inportB;
  mpx_output   outportB;
  mpx_shared int shB[ SIZE ];
};
mpx_celldef cellA{
  mpx_input    inportA;
  mpx_shared int shA[ SIZE ];
};
mpx_view viewA()
{
  ...
  if ( MPX_RANK == MPX_PARALLEL ){
    UB: cellB( comm1, comm2, shA );
  }
}
```

Exemplary Cell Parameters

As noted above, cells may be parameterized. The following presents embodiments using an exemplary implementation using C-style language constructs.

A parameterized cell may have mpx_param declarations in its interface definition. The following is an exemplary declaration of cell parameters:

```
mpx_celldef cell {
  mpx_param int M;
  mpx_param int N;
  mpx_param float F;
  mpx_input IN;
  mpx_output OUT;
};
```

In one exemplary embodiment, declarations of cell parameters may be required to appear within the mpx_celldef (or functional equivalent) definition. A parameter may be required to be declared before its use in some embodiments.

In some embodiments, a parameter may be used to size a cell port or an array variable declared in the file global scope (i.e. a task-global variable or a shared variable), as indicated by the following exemplary declaration that uses parameters to size ports:

```
mpx_celldef cell {
  mpx_param int M;
  mpx_param int N;
  mpx_param float F;
  mpx_input P[N + 1];
  mpx_shared int A[N];
  mpx_output OUT;
};
int arr[N];
mpx_shared int sharr[N];
```

A parameter may affect the number (quantity) and/or selection of tasks and/or cell instances, as illustrated in the following example:

```
mpx_view viewA() {
  if (MPX_RANK >= 0 && MPX_RANK < M) {
    ...
  }
  if (MPX_RANK == MPX_PARALLEL) {
    if (N == 2) {
      U1: kernel(...);
      U2: kernel(...);
    } else if (N == 4) {
      U3: kernel(...);
      U4: kernel(...);
      U5: kernel(...);
      U6: kernel(...);
    }
  }
}
```

In some embodiments, a parameter may be used in a loop to generate instances, as illustrated in the following example:

```
mpx_view viewA() {
  if (MPX_RANK == MPX_PARALLEL) {
    int i;
    for (i = 0; i < N; i++) {
      U: kernel(COMM+i, COMM+i+1);
    }
  }
}
```

In this example, the loop may be unrolled, the comm. id expressions evaluated and instance labels generated, e.g., by the programming toolkit.

For ease of discussion, a parameter that sizes ports or variables or controls task or instance selection/generation may be referred to as a structural parameter.

A parameter may affect a view functionally such as selection of computation, task, or function, and in general may be used in expressions in situations a constant variable may be used. Such uses of a parameter may not impact structure. The following is an exemplary use of parameters to control a computation:

```
mpx_view viewA() {
  if (MPX_RANK == 0) {
    if (M <= 2) {
      <some computation>
    } else {
      <other computation>
    }
  }
}
```

Ranks

In some embodiments, a rank is a scope or block containing a list of statements. The statements may be serial or concurrent. A rank that contains serial statements may execute directly on a processor in the MPA. A rank that contains concurrent statements may contain instantiations of cells. Each of the concurrent statements may be a hierarchical call of the ranks of that instantiated cell.

Exemplary Cell Instantiation

In some embodiments, to use a cell, it must be instantiated. Syntactically, this may resemble a function call but semantically the two concepts may be very different. A cell instantiation is a parallel construct that (in some embodiments) can only occur within a special rank, e.g., called MPX_PARALLEL. In some embodiments, the list of arguments passed to the cell instantiation may correspond to the cell's ports in the order defined by the cell interface definition.

In one embodiment, the following may be passed via a cell's interface:
constant comm id;
comm port of the parent cell;
name of an array variable declared with const MPX_Comm_t;
shared or semaphore variable declared in the parent cell;
data port of the parent cell; and
cell parameters.

Parameter Passing

When a parameterized cell is instantiated, each parameter may be passed an actual expression which in some embodiments may be, without limitation:
a scalar constant value;
a simple expression involving only scalar constants;
an array variable declared as MPX_Comm_t
a parameter of the parent (instantiating) cell; and
a simple expression involving parameters of the parent cell and scalar constants;

The following exemplary code presents exemplary parameter passing:

```
extern mpx_celldef cellB {
    mpx_param int NUM_PROCS;
    mpx_input DATA;
    mpx_output RESULT;
};
mpx_celldef cellA {
    mpx_input IN;
    mpx_output OUT;
};
mpx_view viewA() {
    if (MPX_RANK == MPX_PARALLEL) {
        U1: cellB(2, IN, 1000);
        U2: cellB(4, 1000, OUT);
    }
}
```

Figure 11:
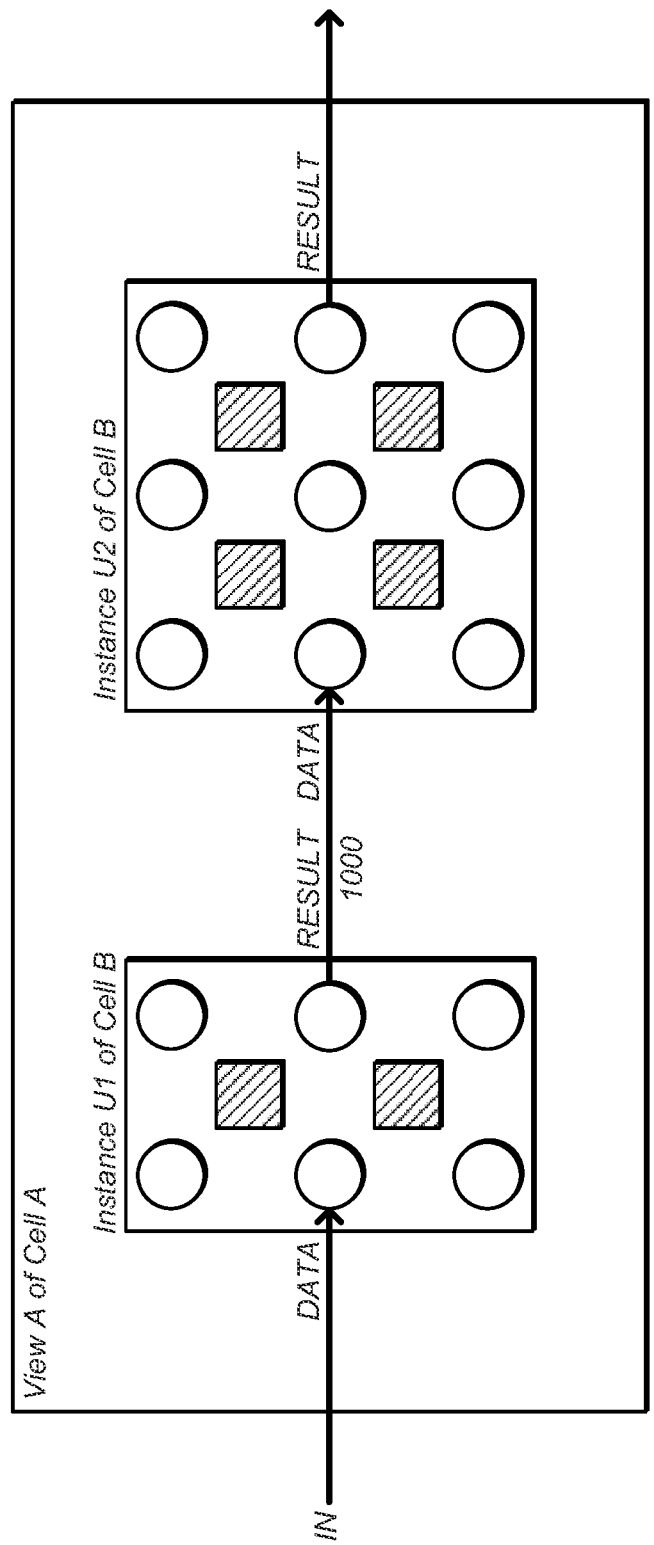
FIG. 11 illustrates a view of a cell and a lower-hierarchy cell instantiated two different ways reflecting different resource optimizations, according to one embodiment.

FIG. 11 illustrates use of a configurable cell following the above exemplary parameter passing example. The diagram shows the two instances, U1 and U2, of cell B inside cell A (strictly, inside this particular example, viewA, of cellA). Shaded squares represent processor resources (PEs) and circles represent memory resources (DMRs) available to those processors. In the illustrated embodiment, cell B is a configurable cell whose parameter NUM_PROCS defines the number of processors it uses. Thus, the instance U1 of cell B has two processors and the instance U2 has four processors (per the declaration above).

Note that the input port of cell A, IN, is directly connected to the input port, DATA, of the instance U1 of cell B in this example. The output port OUT of cell A is directly connected to the output port, RESULT, of the instance U2 of cell B in this example. Further, the output RESULT of instance U1 is connected to the input DATA of U2 via a communication channel 1000 internal to cell A.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable medium that stores software code deployable on a multiprocessor array (MPA), wherein the software code comprises a set of program instructions that:
specify one or more cell definitions that include:
program instructions executable to perform a function; and
one or more language constructs; and
instantiate first, second, and third cell instances, each of which is an instantiation of one of the one or more cell definitions, wherein the instantiation includes configuration of the one or more language constructs such that:
the first and second cell instances communicate via respective communication ports;
the first and second cell instances are included in the third cell instance;
a communication port of the first cell instance is coupled to a first communication port of the third cell instance; and
a communication port of the second cell instance is coupled to a second communication port of the third cell instance different from the first communication port of the third cell instance.

2. The non-transitory computer-readable medium of claim 1, wherein the first cell instance includes one or more other cell instances.

3. The non-transitory computer-readable medium of claim 1, wherein the first and third cell instances are instances of different cell definitions.

4. The non-transitory computer-readable medium of claim 1, wherein the first and third cell instances are instances of the same cell definition but are configured to use different amounts of hardware resources of the MPA.

5. The non-transitory computer-readable medium of claim 1, wherein the cell definition for the third cell instance specifies that it includes one or more cell instances.

6. The non-transitory computer-readable medium of claim 1, wherein the one or more language constructs configure the third cell instance to include the first and second cell instances.

7. The non-transitory computer-readable medium of claim 1, wherein the first and second cell instances are configured to communicate current hardware resource usage.

8. The non-transitory computer-readable medium of claim 1, wherein the communication ports are mappable to dynamic routing circuitry of the MPA that routes communications between processing element of the MPA.

9. A method for configuring a multiprocessor array (MPA), wherein the MPA comprises hardware resources including a plurality of processors and a plurality of memories, the method comprising:
- accessing software code, wherein the software code a set of program instructions that:
  - specify one or more cell definitions that include:
    - program instructions executable to perform a function; and
    - one or more language constructs; and
  - instantiate first, second, and third cell instances, each of which is an instantiation of one of the one or more cell definitions, wherein the instantiation includes configuration of the one or more language constructs such that:
- the first and second cell instances communicate via respective communication ports;
  - the first and second cell instances are included in the third cell instance;
  - a communication port of the first cell instance is coupled to a first communication port of the third cell instance; and
  - a communication port of the second cell instance is coupled to a second communication port of the third cell instance different from the first communication port of the third cell instance; and
- deploying the first, second, and third cell instances on the MPA.

10. The method of claim 9, wherein the first cell instance includes one or more other cell instances.

11. The method of claim 9, wherein the cell definition for the third cell instance specifies that it includes one or more cell instances.

12. The method of claim 9, wherein the one or more language constructs configure the third cell instance to include the first and second cell instances.

13. The method of claim 9, further comprising:
- dynamically adjusting an amount of hardware resources of the MPA that is assigned to the first cell instance.

14. The method of claim 9,
- wherein the first and second cell instances are configured to communicate current hardware resource usage.

15. A system, comprising:
- one or more processors; and
- one or more memories having program instructions stored thereon that are executable to deploy software code on a multiprocessor array (MPA), wherein the software code comprises a set of program instructions that:
  - specify one or more cell definitions that include:
    - program instructions executable to perform a function; and
    - one or more language constructs; and
  - instantiate first, second, and third cell instances, each of which is an instantiation of one of the one or more cell definitions, wherein the instantiation includes configuration of the one or more language constructs such that:
    - the first and second cell instances communicate via respective communication ports;
    - the first and second cell instances are included in the third cell instance;
    - a communication port of the first cell instance is coupled to a first communication port of the third cell instance; and
    - a communication port of the second cell instance is coupled to a second communication port of the third cell instance different from the first communication port of the third cell instance.

16. The system of claim 15, wherein the first cell instance includes one or more other cell instances.

17. The system of claim 15, wherein the one or more language constructs configure the third cell instance to include the first and second cell instances.

18. The system of claim 15, wherein the deployment maps communication to dynamic routing circuitry of the MPA that is configured to routes communications between processing element of the MPA.

19. The system of claim 15,
- wherein the cell definition for the third cell instance specifies that it includes one or more cell instances.

20. The system of claim 15,
- wherein the first and second cell instances are configured to communicate current hardware resource usage.

* * * * *